United States Patent [19]

Sato et al.

[11] Patent Number: 4,513,615
[45] Date of Patent: Apr. 30, 1985

[54] THERMAL AIR FLOW METER

[75] Inventors: Kanemasa Sato; Sadayasu Ueno, both of Katsuta, Japan

[73] Assignee: Hitachi, Ltd., Tokyo, Japan

[21] Appl. No.: 558,278

[22] Filed: Dec. 5, 1983

[30] Foreign Application Priority Data

Dec. 8, 1982 [JP] Japan .................. 57-213869

[51] Int. Cl.³ .................................. G01F 1/68
[52] U.S. Cl. .................................. 73/204
[58] Field of Search ................. 73/204, 118 A

[56] References Cited

U.S. PATENT DOCUMENTS

| | | | |
|---|---|---|---|
| 4,264,961 | 4/1981 | Nishimura | 73/204 |
| 4,369,656 | 1/1983 | Veno et al. | 73/204 |
| 4,393,697 | 7/1983 | Sato et al. | 73/118 |

FOREIGN PATENT DOCUMENTS 48618  4/1980  Japan .................. 73/204

*Primary Examiner*—Herbert Goldstein
*Attorney, Agent, or Firm*—Antonelli, Terry & Wands

[57] ABSTRACT

A thermal air flow meter consists essentially of a hollow cylindrical support made of an insulating material, a heat-sensitive resistor formed on top of the support, and lead wires inserted into the hollow part of the support from either end and bonded thereto by glass. This flow meter measures the flow rate from changes in the resistance of the heat-sensitive resistor with temperature. The ratio of the inner diameter $d_2$ of the support to the outer diameter $d_3$ of the lead wires ($d_2/d_3$) is at least 1.7. This arrangement can provide a thermal air flow meter with a quick response to changes in flow rate.

5 Claims, 9 Drawing Figures

THERMAL AIR FLOW METER

BACKGROUND OF THE INVENTION

This invention relates to a thermal air flow meter. More particularly, the present invention relates to a thermal air flow meter which is suitable for measuring the quantity of air taken in by an internal-combustion engine of an automobile.

In an internal-combustion engine of an automobile equipped with a fuel injection system, the operational state of the internal-combustion engine is detected by signals from various sensors, and the quantity of fuel injected by the fuel injection system, etc., is controlled. A thermal air flow meter is one of these sensors, it is used for measuring the quantity of air taken in by the engine. Thermal air flow meters of various types are known, but thermal air flow meters using temperature-dependent, heat-sensitive resistors have gained a wide application because they provide a high measurement accuracy. As disclosed in U.S. Pat. No. 4,264,961, for example, an advantageous thermal air flow meter has a construction in which part of the air flowing through an intake pipe is introduced into a by-pass pipe past a heat-sensitive resistor disposed in this by-pass pipe. This is advantageous because such a flow meter undergoes hardly any mechanical damage due to backfires that can occur when the engine is not running properly.

The heat-sensitive resistor has the following construction. Platinum wire of 20 μm diameter is wound around an alumina bobbin which is 0.5 mm in diameter and 2 mm long to form the heat-sensitive resistor for the thermal air flow meter. Lead wires consisting principally of platinum are bonded to both ends of the bobbin by adhesive, and the lead wires are spot-welded to supports. The thermal air flow meter using this heat-sensitive resistor has the problem that when the flow rate changes suddenly, particularly when the flow rate increases suddenly, the response of the flow meter drops.

Flow meters of this construction are used mainly in multi-point fuel injection systems. Recently, engines with single point fuel injection systems have been examined. It has been found that when a flow meter of the construction described above is used in a single point fuel injection system, its response during acceleration is low, and this must be improved. In a single point fuel injection system, a single fuel injection valve is provided at the point at which the intake pipes of the engine join, and hence the distances from the fuel injection position to the cylinder inlets are longer than those of a multi-point fuel injection system. This means that the time taken for the fuel to arrive at each cylinder is longer. The distance from the fuel injection position to each cylinder varies from cylinder to cylinder. This means that if the shape of the intake pipes changes because of changes to the engine, delicate matching must be carried out. Accordingly, the detection accuracy must be improved by use of a very accurate flow meter, particularly at high speeds, so as to accurately follow pulsations in the flow of intake air to the engine.

As a result of examining the response of thermal air flow meters, it has been found that when the flow rate is changed in steps, a time constant $1\tau$ (the time at which 63% of full scale is reached) is rapid but $3\tau$ (the time at which 95% of full scale is reached) is slow. $1\tau$ is mainly determined by the response of the driving circuit of the flow meter, while $3\tau$ is determined by the thermal characteristics of the heat-sensitive resistor and its supports.

SUMMARY OF THE INVENTION

It is therefore an object of the present invention to provide a thermal air flow meter which has a good response to changes in flow rate.

In a thermal air flow meter for measuring flow rate of the type which consists of a hollow cylindrical support made of an insulating material, a heat-sensitive resistor formed on this support, and lead wires inserted into the hollow part of the support from either side and bonded thereto by a heat-insulating adhesive, and which measures the flow rate on the basis of resistance changes in the heat-sensitive resistor due to temperature, the object of the present invention stated above can be accomplished by an thermal air flow meter which satisfies the relationship $d_2/d_3 \geq 1.7$, where $d_2$ is the inner diameter of the support and $d_3$ is the outer diameter of the lead wire.

The effect described above can be achieved because the temperature of the heat-sensitive resistor can sufficiently follow the flow rate even when the heat transfer from the lead wires to the heat-sensitive resistor drops and the flow rate changes rapidly.

As the heat-insulating adhesive, borosilicate glass or lead glass with a softening point of at least 800° C. is preferred, because of their heat-insulating properties and bond strength.

If the diameter of the lead wires is reduced, the problem will occur that the mechanical strength of the lead wires will drop, and the measurement accuracy will also drop because of oscillations of the heat-sensitive resistor, etc. For this reason, the value of $d_2/d_3$ can not be increased very far: its maximum is approximately 2.3. The optimal range is between about 1.8 to about 2.0.

If the length of each lead wire is at least 1.5 times that of the supports, the heat transferred from the supports through the lead wires can be reduced, and hence the response can be further improved.

DESCRIPTION OF THE PREFERRED EMBODIMENTS

Figure 1:
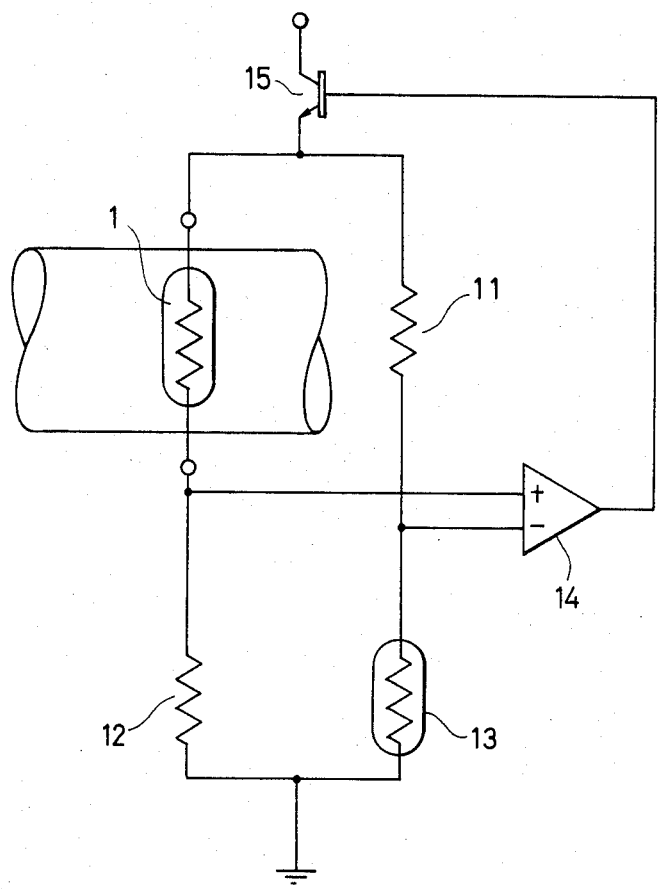
FIG. 1 is a diagram of a thermal air flow meter.

FIG. 1 is a schematic diagram of the thermal air flow meter. In the drawing, a heat-generating resistor element 1 forms a bridge together with other resistors 11, 12, and 13. The voltage differences of these bridge resistors are differentially amplified by an amplifier 14, to form a feedback circuit for driving a transistor 15. The heat-generating resistor element 1 is positioned in a fluid passage together with a temperature-compensating resistor 13. The temperature of the heat-generating resistor element 1 is controlled by the feedback circuit so that it is always kept at a predetermined temperature difference (between about 100° to about 200° C.) above ambient temperature. The heat-generating resistor element 1 and the temperature-compensating resistor 13 are heat-sensitive resistors.

Figure 2:
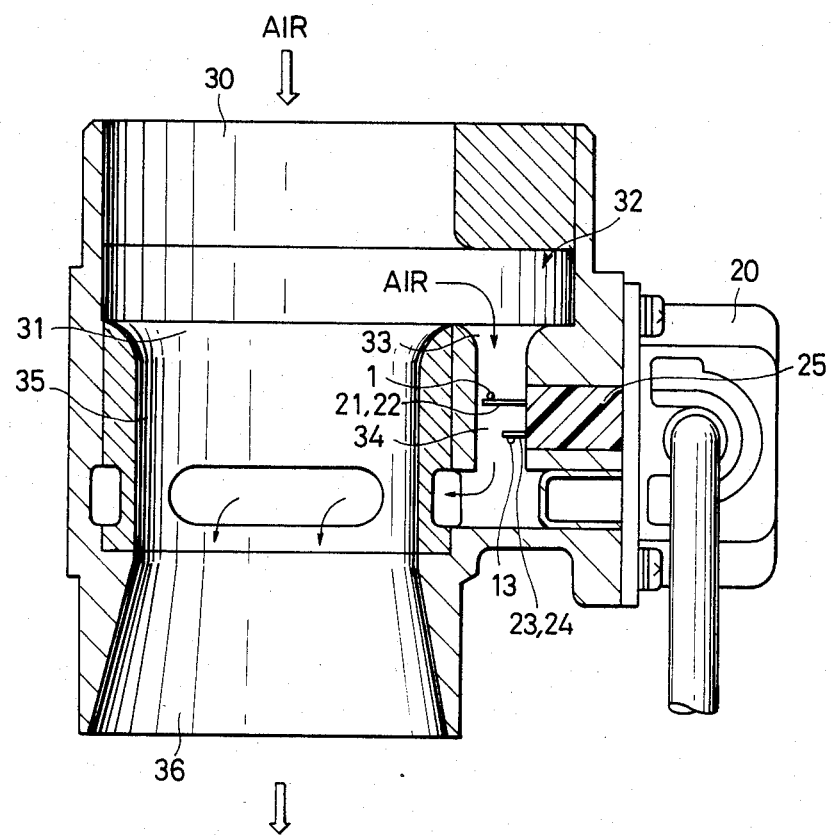
FIG. 2 is a sectional view of a thermal air flow meter used for measuring the quantity of intake air in an internal-combustion engine.

FIG. 2 illustrates a thermal air flow meter for measuring the quantity of intake air in an internal-combustion engine of an automobile. The heat-generating resistor element 1 and the temperature-compensating resistor 13 are supported by support pins 21, 22 and 23, 24, respectively, and are mounted in a chamber forming a fluid passage and integrated into a 4-terminal holder 25 into which the support pins 21 through 24 are inserted. The driving circuit portion which is connected electrically to the heat-generating resistor element 1 and to the temperature-compensating resistor 13 is held in a housing 20.

A by-pass passage 33 is formed within the chamber so as to extend from an inlet portion 30 through a static pressure intake port 32 which opens off a main passage 31. The heat-generating resistor element 1 and the temperature-compensating resistor 13 are positioned in a central straight pipe portion 34 of the by-pass passage 33. The downstream portion of the by-pass passage 33 extends for a predetermined distance in an annular form around the circumferential direction of the main passage 31 and joins a venturi portion 35 of the main passage 31. A discharge port 36 is connected to the intake pipes of the engine by a duct interrupted by a throttle chamber. The chamber inlet portion 30 is connected to an air cleaner. The discharge port 36 is connected to the intake pipes by the throttle chamber. A typical construction of a single point fuel injection flow meter is such that the flow meter is integrated with a throttle chamber which contains an injector, and is mounted directly in the place at which the intake pipes join.

Figure 3:
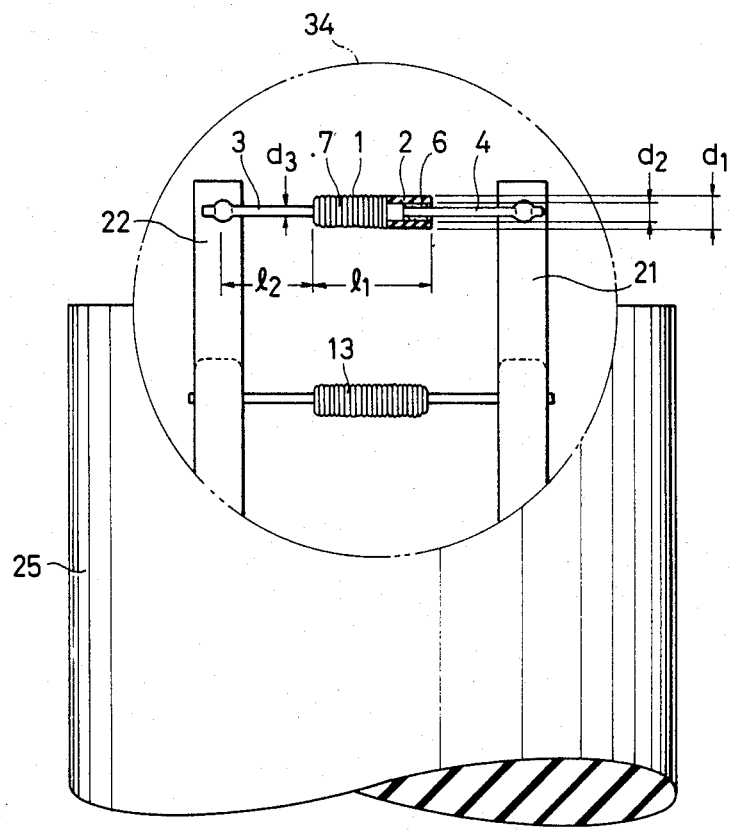
FIG. 3 is a partial sectioned view of the heat-sensitive resistor of the thermal air flow meter in accordance one embodiment of the present invention.
Figure 3A:
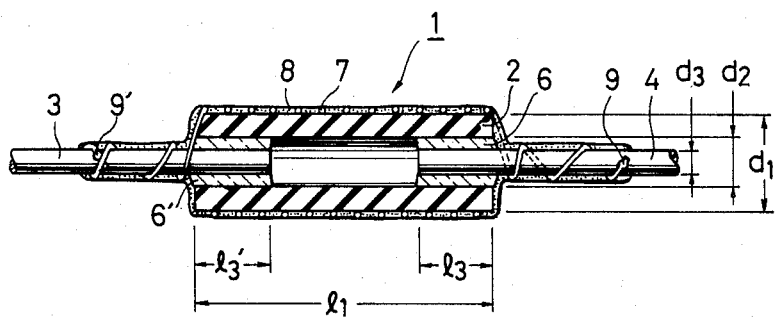
FIG. 3A is an enlarged section through the heat-sensitive resistor of FIG. 3.

FIG. 3 shows in detail the heat-generating resistor element 1 in accordance with one embodiment of the present invention, and FIG. 3A is an enlarged section through the heat-generating resistor element. The heat-generating resistor element 1 will now be described in detail with reference to these drawings. An alumina pipe or bobbin 2 used as an insulating material is provided, and lead wires 3, 4 are concentrically inserted into either end of the pipe 2. The length $l_1$ of the pipe is 2.0 mm, the length $l_2$ of the lead wires is 2.5 mm, and the length $l_3$ by which each lead wire is inserted into the pipe 2 is about 0.5 mm. Adhesive 6,6' is provided between the lead wires 3, 4 and the pipe 2 to mechanically connect them. They are bonded at least 1,000° C. using borosilicate glass powder as the adhesive 6,6'. A thin platinum wire 7 of 20 μm diameter is wound around the outer circumference of the pipe 2. The ends of this thin platinum wire 7 are spot-welded at spot-weld portions 9,9' to the lead wires 3,4, respectively, to provide electric connection. Lead glass powder blended with a binder is applied so as to cover the thin platinum wire 7 and the spot-weld portions 9,9', and this is then baked at about 600° C. to form a protective layer 8. The lead wires 3,4 are spot-welded to pins 21, 22, respectively.

Figure 4:
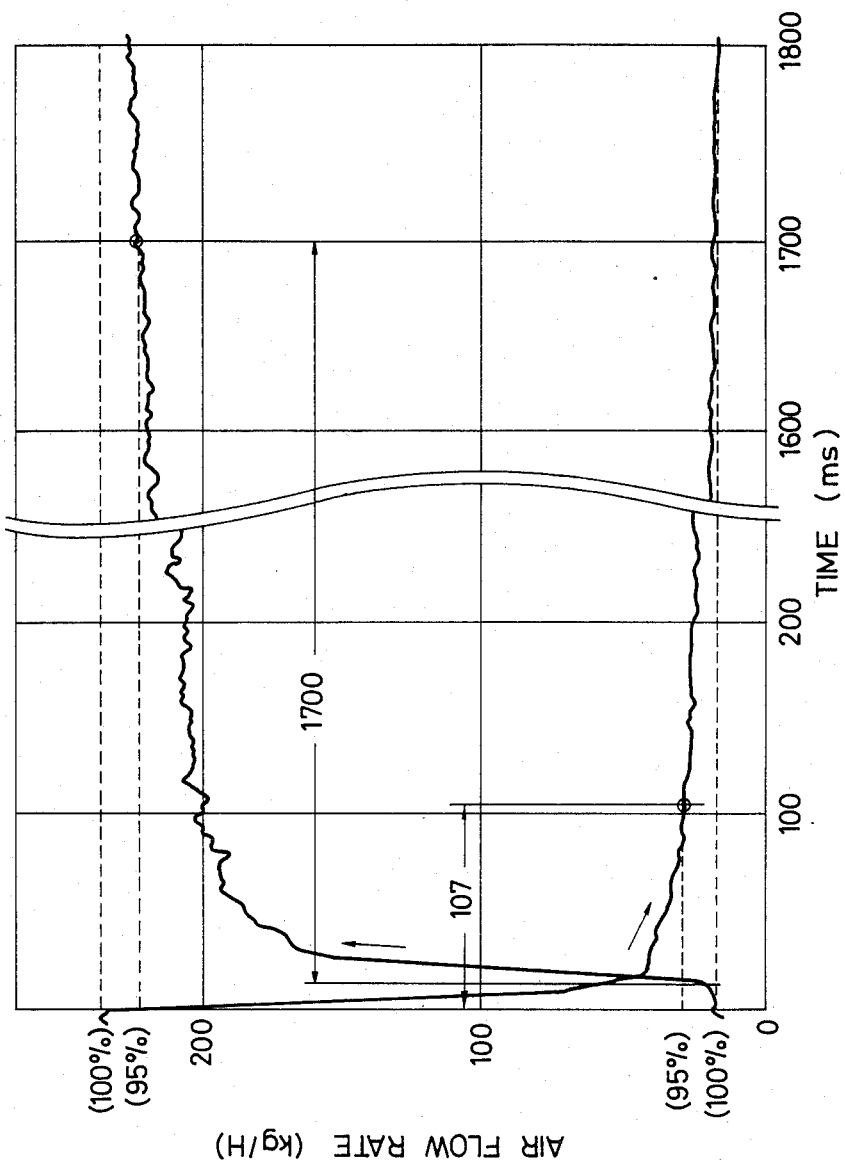
FIGS. 4 and 5 are graphs of measured values of air flow rate.

In resistors of the construction described above, measurements were made of changes in response characteristics due to changes in the outer diameter $d_1$ of the pipe 2, its inner diameter $d_2$, and the outer diameter $d_3$ of the lead wires 3, 4 and also due to stepped changes in the air flow rate. The results are shown in FIG. 4. This graph illustrates a test in which the outer diameter $d_1$ of the pipe was 0.6 mm, its inner diameter $d_2$ was 0.3 mm, and the outer diameter $d_3$ of the lead wires 3, 4 was 0.225 mm. In this test, the response time to $3\tau$ (the time at which 95% of full scale was reached) for a stepped rise was 1,700 ms, and the response time to $3\tau$ for a stepped fall was 107 ms. It can be seen that the response time at the time of rise was particularly long.

Figure 5:
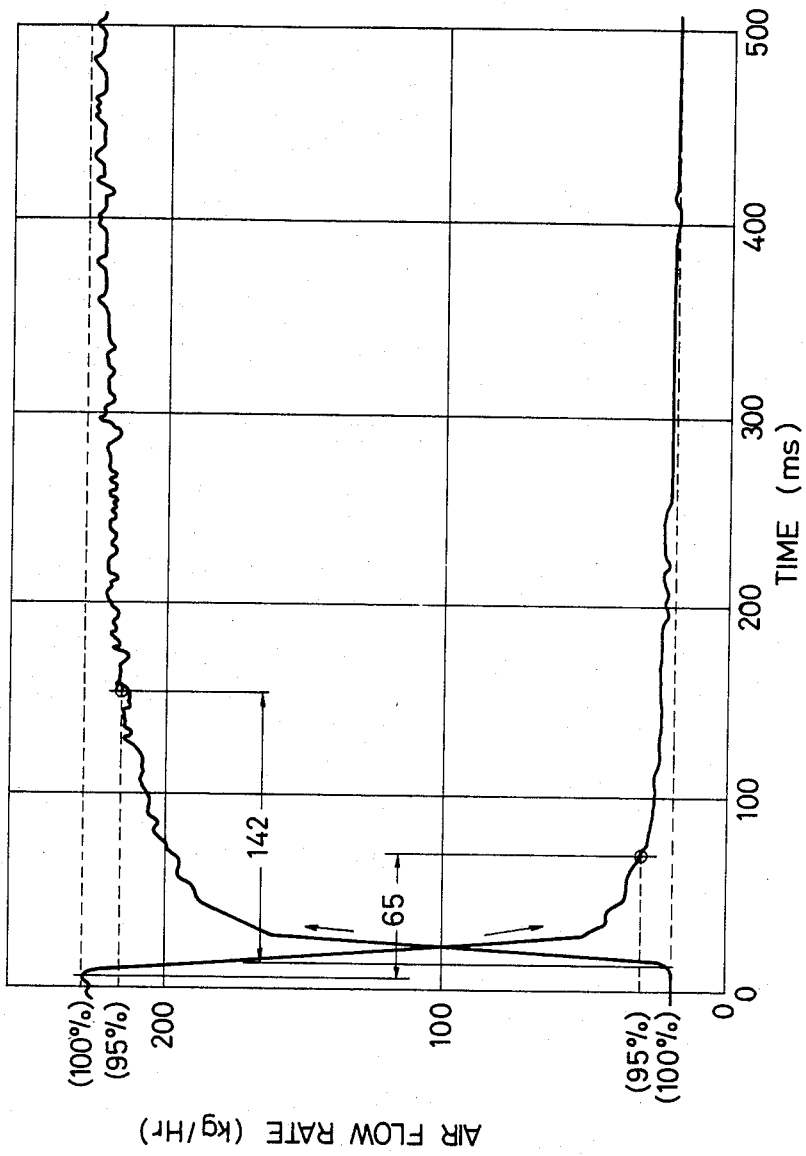

FIG. 5 illustrates a test in which the outer diameter $d_1$ of the pipe 2 was 0.6 mm, its inner diameter $d_2$ was 0.3 mm, and the outer diameter $d_3$ of the lead wires 3, 4 was 0.16 mm. The response time to $3\tau$ for a stepped rise was much better at 142 ms, with the response time to $3\tau$ for a stepped fall also improved at 65 ms.

Figure 6:
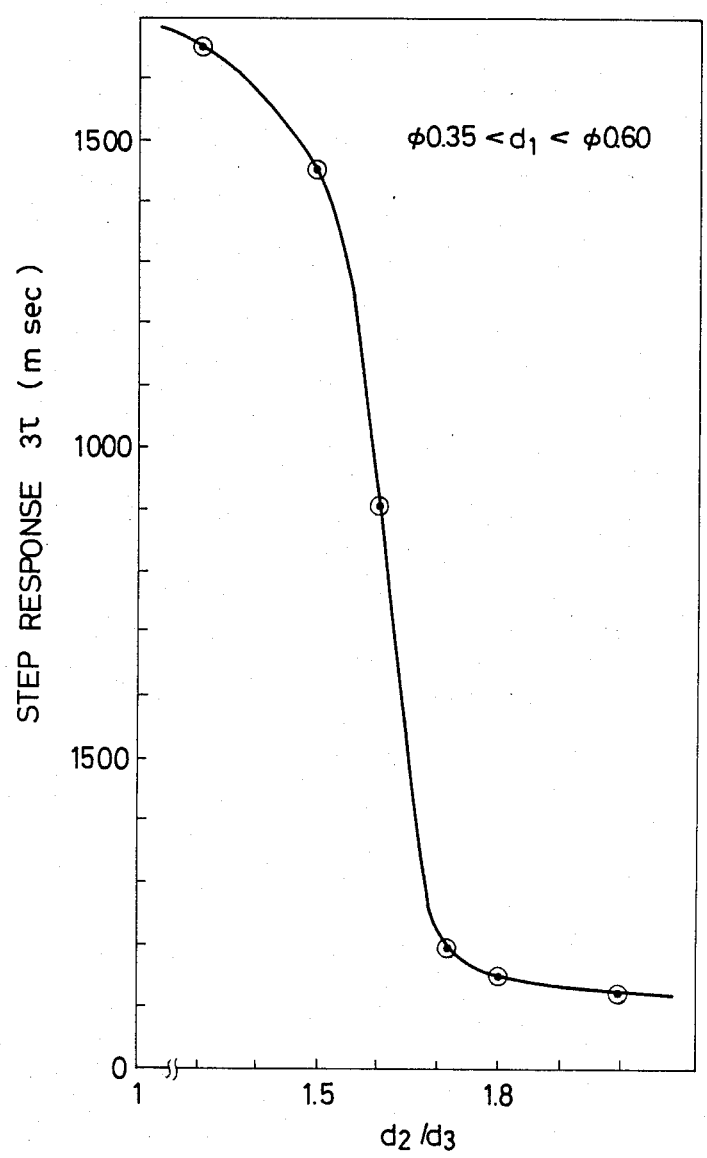
FIG. 6 is a graph of the relationship between the ratio of the inner diameter of the support of the heat-sensitive resistor to the outer diameter of the lead wire, and step response.

FIG. 6 illustrates tests in which the outer diameter $d_1$ of the pipe 2 was 0.6 mm, its inner diameter $d_2$ was 0.3 mm, and the outer diameter $d_3$ of the lead wires 3, 4 were 0.225 mm, 0.2 mm, 0.18 mm, 0.175 mm, 0.16 mm, or 0.15 mm. The graph shows the response time to $3\tau$ in relation to the ratio $d_2/d_3$, for a stepped rise. It can be seen that when the ratio $d_2/d_3$ was at least 1.7, the response time was much better. When the $d_2/d_3$ was close to 1, the thickness of the adhesive layers 6,6' was small so that hardly any heat insulating effect could be obtained.

If the ratio $d_2/d_3$ is at least 1.7, the difference between the inner diameter of the pipe 2 and the diameter of the lead wires 3, 4 is so large that the thickness of the adhesive layers 6, 6' also becomes large so that the heat insulating effect provided by these adhesive layers can be obtained. Accordingly, thermal equilibrium of the pipe 2 is reached almost as soon as the adhesive layers 6, 6' receive the heat transferred from the pipe 2 and start to transfer the heat to the lead wires 3, 4, and the temperature distribution of the adhesive layers 6, 6' also reaches substantially its final value. Thus, a thermal air flow meter with a good response can be obtained. If $d_2/d_3$ is greater than 1.7, the response time is hardly affected by the increase in the thickness of the adhesive layers 6, 6', but the diameter of the lead wires 3, 4 is small and their mechanical tensile strength (which must be at least 800 gr) drops. Hence, $d_3$ must be 0.13 mm. In other words, the limit for $d_2/d_3$ is 2.3 when $d_2$ is 0.3 mm. Because of machining tolerances, the optimal ratio is between 1.8 to 2.0.

When pipes of an outer diameter of 0.35 mm were examined, substantially the same results could be obtained. If the outer diameter $d_1$ of the pipe is too great, however, the heat capacity of the pipe becomes too much so that response drops.

The adhesive may be lead glass with a softening point of at least 800° C., besides borosilicate glass.

The glass applied as a coating over the thin platinum wire is lead glass having a softening point of between 500° to 700° C.

Since the rise response time can be shortened, the difference in response time between rise and fall can be reduced, so that when detecting a pulsating flow within an engine, the flow rate can be detected with a level of accuracy close to the mean value, and the efficiency with which the flow rate is detected can be therefore improved.

The resistor can be formed of a thick or thin platinum film. In other words, a thin platinum film is formed by sputtering, ion plating, vacuum deposition, etc., or a thick platinum film can be formed by printing or coating platinum paste, and the film is heat-treated at a high temperature. The treatment temperature is between 700° to 800° C. for a thin film, and between 900° to 1,000° C. for a thick film. The film resistor thus formed is trimmed by a laser so as to obtain a predetermined resistance value.

Figure 7:
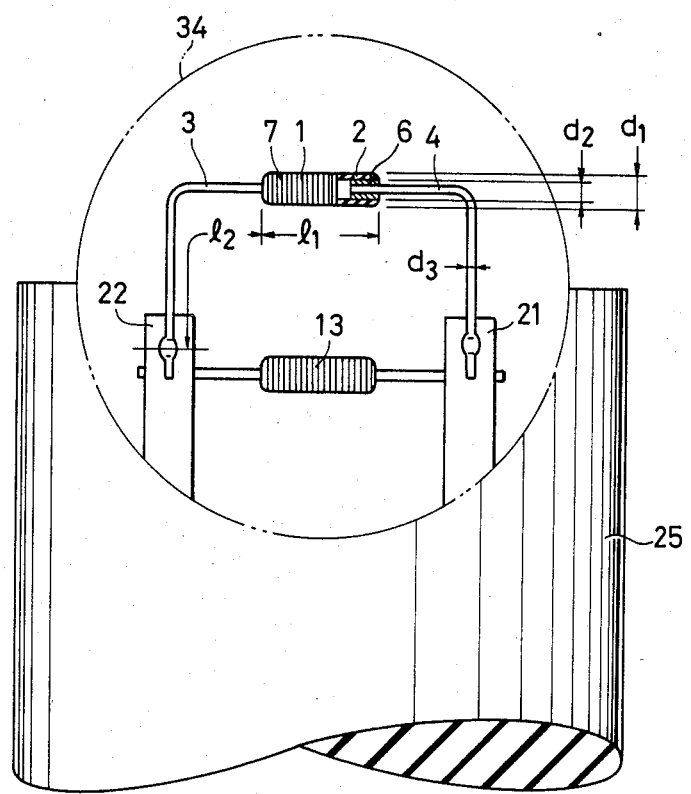
FIG. 7 is a partial sectioned view of the heat-sensitive resistor of the thermal air flow meter in accordance with another embodiment of the present invention.

FIG. 7 illustrates another embodiment of the present invention.

When the heat-generating heat-sensitive resistor 1 is mounted onto the 4-terminal holder 25, the leads 3, 4 can be shaped by bending them at right angles into L-shapes at a length of 1.5 mm, for example, from the bobbin ends. The distance $l_2$ of each lead from the bobbin end to the stainless steel supports 21, 22 is set to satisfy the relationship $l_1/l_2 < 1/1.5$, with respect to the bobbin length $l_1$. If the bobbin length $l_1$ is 2.0, for example, the lead length $l_2$ is 3.5, for example. The 4-terminal holder assembly thus assembled is electrically connected to the driving circuit 20 for the heat-generating resistor 1, and is integrated with the throttle chamber containing an injector. When the assembly was incorporated in a single point fuel injection system and matching was effected for a 4-cycle 4-cylinder engine, the operation was found to be normal, and the operational performance during acceleration was found to be superior to that of an automobile provided with a carburetor.

The construction illustrated in this embodiment was found to be sufficiently resistant to vibrations of 30 G and between 20 to 1 kHz in each of the X, Y and Z axes for 3 hours. It could also withstand sufficiently 60 G vibrations for 1 hour in the direction of flow, which is the most critical condition for vibration resistance. It was also confirmed that the flow meter had no resonance points in the range of between 20 to 1 kHz, and had a sufficiently high mechanical durability. When an interrupted power feed test was carried out by turning on and off the power for four seconds each at a set temperature of 300° C., it was confermed that the heat-generating resistor could withstand 1,000 cycles.

Figure 8:
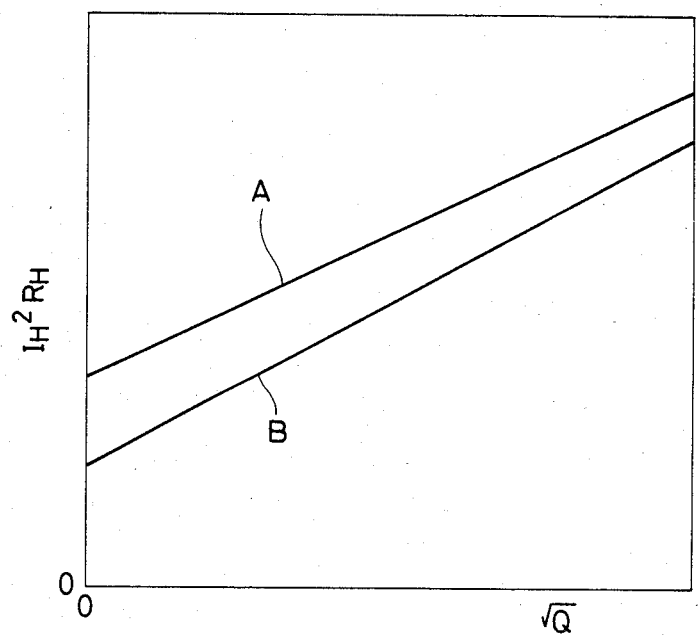
FIG. 8 is a graph comparing the power consumption of a prior-art flow meter with that of one embodiment of the present invention.

The heat-insulating structure provided by the uses of a glass adhesive has the effect of reducing the power consumption of the heat-generating resistor heated to a predetermined temperature. FIG. 8 is a graph of the thermal characteristics A of a prior-art flow meter in comparison with those B of a flow meter in accordance with one embodiment of the present invention. The ordinate represents the power $I^2_H R_H$ applied to the heat-generating resistor, and the abscissa represents the square root of the flow rate Q. The power consumption of the embodiment of the present invention was reduced to 1/1.5 on the side of low flow rate. The temperature difference in the axial direction was also relatively small, and the sensitivity to the flow was improved by about 10%.

The present invention provides the following effects.

Because heat insulation is provided by the glass bonding between the bobbin and the leads, and the cross-sectional area of each lead is reduced, heat transfer to the supports can be reduced and the rise response time shortened.

The power applied to the heat-generating resistor can be reduced and the sensitivity of the heat dissipation characteristics to the air flow can be improved.

The difference in response time between rise and fall can be reduced so that a value approximately equal to the true mean value of a pulsating flow can be detected, and the accuracy with which the flow rate is measured can be improved.

Since the heat-generating, heat-sensitive resistor and the temperature-compensating resistor are positioned within the bypass passage, adverse influences due to backfiring and dust can be reduced.

The present invention can provide a thermal air flow meter with a quick response time to the changes in flow rate.

What is claimed is:

1. In a thermal air flow meter which consists essentially of a hollow cylindrical support made of an insulating material, a heat-sensitive resistor formed on top of said support, and lead wires inserted into the hollow part of said support from either end of said support and bonded to said support by a heat-insulating adhesive, and which measures the flow rate on the basis of changes in resistance due to the temperature of said heat-sensitive resistor, the improvement wherein the ratio of the inner diameter $d_2$ of said support to the outer diameter $d_3$ of said lead wires is at least 1.7.

2. The thermal air flow meter as defined in claim 1 wherein the ratio $d_2/d_3$ is between 1.8 to 2.0.

3. The thermal air flow meter as defined in claim 1 wherein said adhesive is borosilicate glass.

4. The thermal air flow meter as defined in claim 1 wherein said adhesive is lead glass with a softening point of at least 800° C.

5. The thermal air flow meter as defined in claim 1 wherein the length $l_2$ of each of said lead wires from the end of said support to the attachment position thereof is at least 1.5 times the length $l_1$ of said support.

* * * * *